Dec. 15, 1925.
J. CASSIE
1,565,622
FRUIT GRADER
Filed July 7, 1924
2 Sheets-Sheet 1
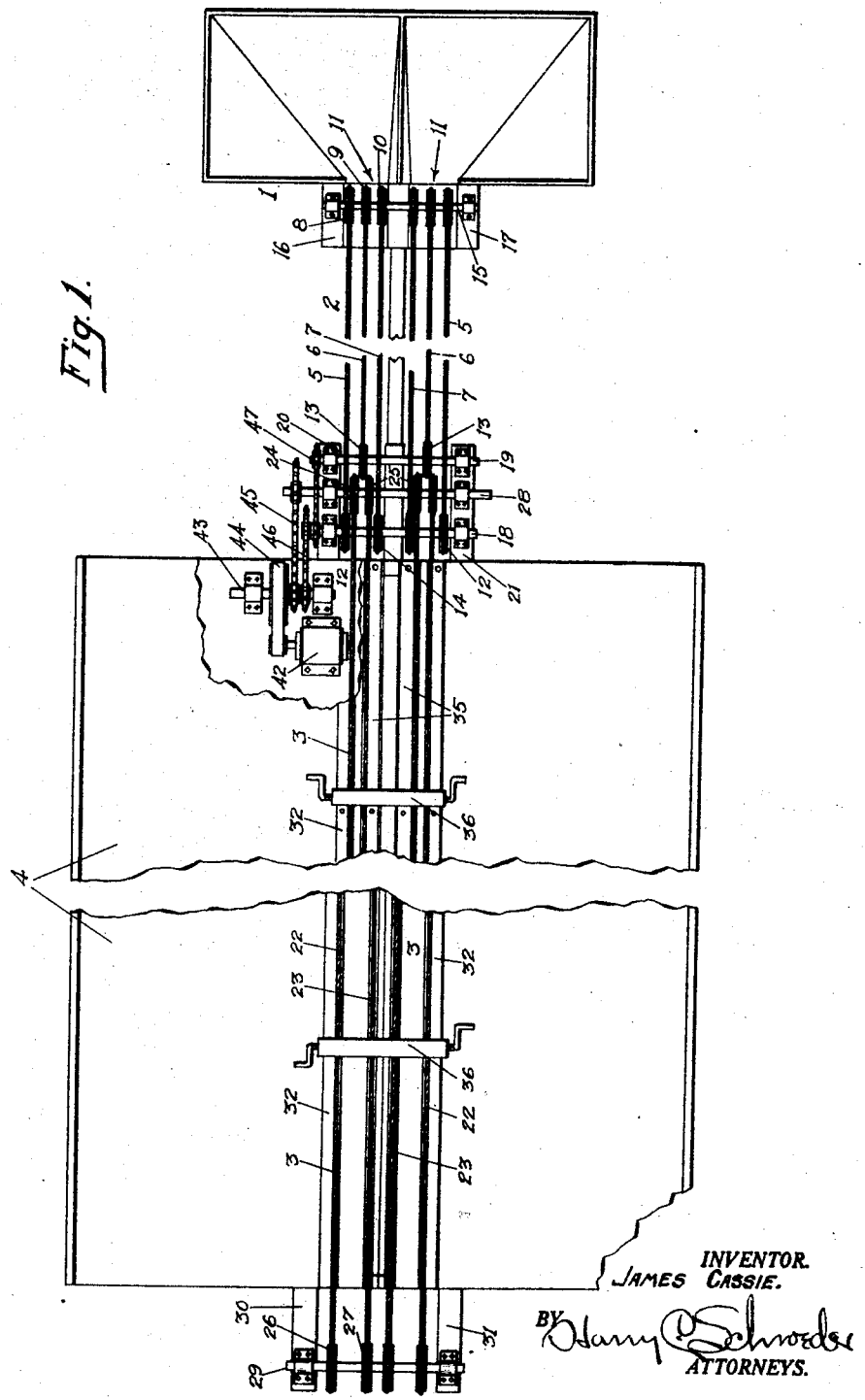
INVENTOR.
JAMES CASSIE.
BY Harry C Schroeder
ATTORNEYS.

Dec. 15, 1925.   J. CASSIE   1,565,622
FRUIT GRADER
Filed July 7, 1924   2 Sheets-Sheet 2
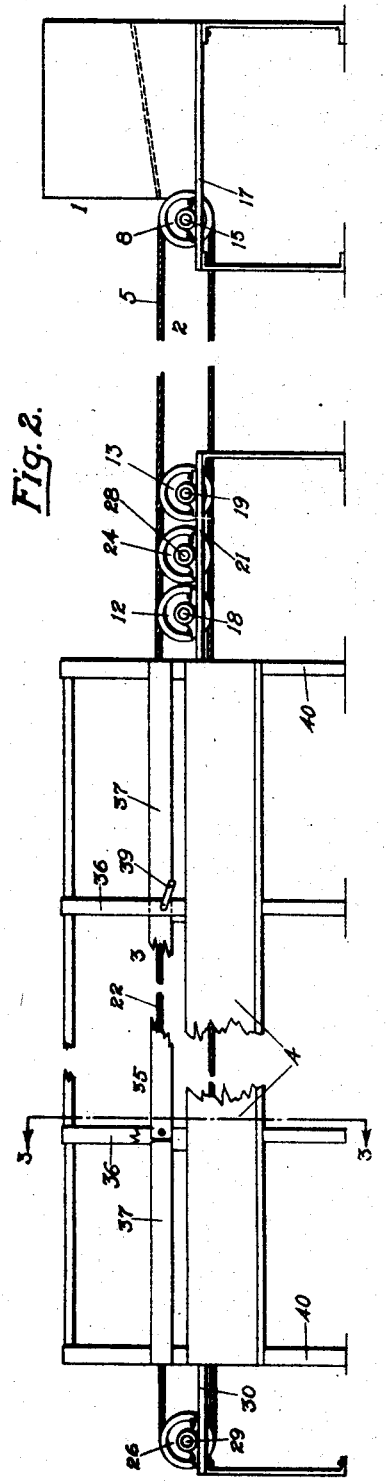
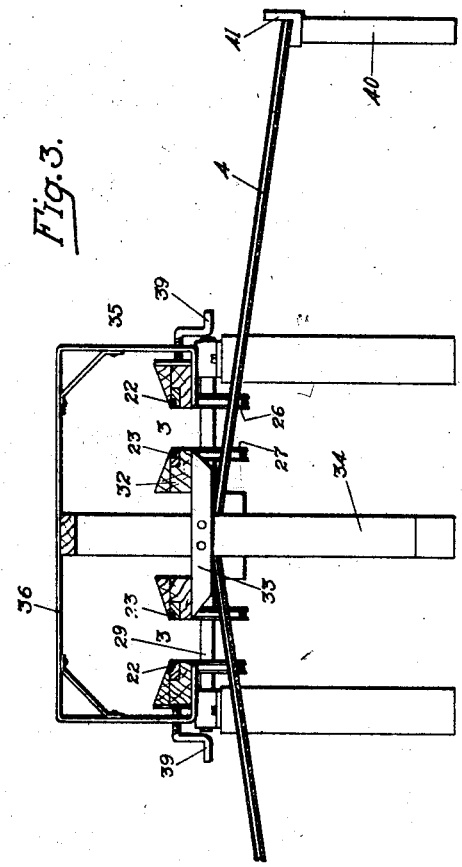
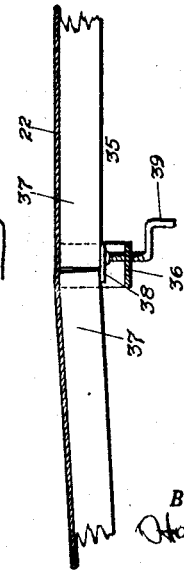
INVENTOR.
JAMES CASSIE.
BY
ATTORNEYS.

Patented Dec. 15, 1925.

1,565,622

UNITED STATES PATENT OFFICE.

JAMES CASSIE, OF COURTLAND, CALIFORNIA.

FRUIT GRADER.

Application filed July 7, 1924. Serial No. 724,594.

*To all whom it may concern:*

Be it known that JAMES CASSIE, a citizen of the United States, residing at Courtland, in the county of Sacramento and State of California, has invented certain new and useful Improvements in Fruit Graders, of which the following is a specification.

My invention is an improved grader, particularly applicable for grading various kinds of fruit.

The object of my invention is to provide a grader having a pair of diverging conveyors, through which the fruit drops upon a table.

The object of my invention is to provide a fruit grader with a conveyor, the conveyor being formed of three parallel ropes forming a pair of parallel conveyors running at slow speed so that the fruit may be graded and culled. These conveyors lead to a fruit sizing conveyor formed of two parallel ropes running at a higher speed than the feeder conveyor ropes. The feeding conveyor and the sizing conveyor overlap each other at the same level by the pair of outside feeder ropes overlapping the sizer ropes. By this construction the fruit is transferred from the feeder to the sizer conveyors at the same level and by merely rolling from one pair of ropes onto another pair.

The sizing conveyor has a fixed guideway for one of the ropes running the length of the machine. The other rope is guided in a sectional guideway in which any section may be moved towards and from the fixed guideway independently of any other section.

In practice possibly the first bin near the feeding in end will have the conveyors spaced closest together to secure the small sizes, possibly four or five bins in succession will have the conveyors substantially parallel to obtain the majority size of the fruit, whereas at the end of the machine the guides will be spaced apart at increasing distances to secure the larger sizes. In this arrangement the first bin of the majority size soon becomes loaded, and when this is the case the packer at this bin operates a crank having a screw thereon which forces one of the sectional guides inwardly, thereby narrowing the sizer conveyor at his bin. This passes the fruit along to other bins taking the majority size which can be filled up in succession. When the first majority size packer has cleared his bin he may widen the guides by turning the crank in the opposite direction, drawing the sectional guide outwardly until the bin is filled with standard sized fruit.

In sizing fruit, especially for instance pears, for which this machine is especially applicable, very often more than 50% of the fruit will run to one size.

It will thus be seen that with my machine I may operate the sectional guides to space the sizing conveyors narrower or wider at any bin than at the adjacent or more removed bins and these conveyors may be readily altered by the packer stationed at the machine in order to load his bin or pass the fruit on to a further bin.

A machine is usually made in duplicate; that is, with a double set of sizing conveyors with packing bins at each side. The operators grade the fruit at the feeding conveyors by transferring a higher grade to a lower grade and vice versa and removing the culls. The sizing part of the machine is usually about 40 ft. in length to accommodate eight packers on each side, each having a 5 ft. bin.

A further object is to provide a grader which is simple in construction and inexpensive to manufacture.

In the annexed drawings, I have illustrated the preferred form of my invention, but it may also be embodied in other forms, and in this application I desire to cover my invention in whatever form it may be embodied.

Figure 1 is a fragmentary plan view of my grader.

Figure 2 is a side elevation of the same.

Figure 3 is an enlarged sectional view taken on the line 3—3 of Fig. 2.

Figure 4 is an enlarged fragmentary plan view of the conveyor guides.

Referring more particularly to the drawing, I have illustrated a double machine, but one side only will be described, since both are the exact duplicates. In actual practice it is usually desirable to employ duplicate graders in parallel arrangement, from the standpoint of economy in space and time.

From the hopper 1 the fruit is carried on conveyors 2 to a second conveyor 3 which travels over the table 4. The conveyors 2 and 3 are preferably formed of ropes, but any other desirable medium may be employed. The conveyor 2 consists of three parallel ropes 5, 6 and 7, which travel over pulleys 8, 9 and 10 respectively, adjacent the outlet 11 of the hopper 1, and over pulleys 12, 13 and 14 adjacent the head end of the table 4. The pulleys 8, 9 and 10 are all mounted on the shaft 15, which is journaled on brackets 16 and 17. The pulleys 12 and 14 are both mounted on a shaft 18, and the pulleys 13 are mounted on shaft 19. Both shafts are journaled on brackets 20 and 21.

The conveyor 3 is formed of two ropes 22 and 23, which gradually diverge from the head to the rear ends. These ropes travel over pulleys 24 and 25 respectively at the head end and pulleys 26 and 27 respectively at the rear end. The pulleys 24 and 25 are mounted on a shaft 28, which is journaled on the brackets 20 and 21, and the pulleys 26 and 27 are secured to a shaft 29 journaled on the brackets 30 and 31. The rope 23 travels in a groove in a fixed guide 32 extending the length of the grader, and supported at intervals on arms 33 secured to posts 34.

The guide 35 in which the rope 22 runs is sectional and adjustable with relation to the guide 32, and is supported at intervals on brackets 36 which are secured to the posts 34. The forward ends of the sections 37 of the guide 35 are provided with plates 38 secured thereto, and engaging the adjacent section. A threaded handle 39 is secured to each of the plates 38 and is threaded through the bracket 36. Thus as the handle is rotated the section 37 is adjusted with relation to the fixed guide 32.

The table 4 is canvas covered and inclined away from the conveyor 3. It is secured to the posts 34 and supported at its outer end on legs 40. A rim 41 along the outer edge of the table 4 prevents the fruit from dropping therefrom.

In operation the fruit is placed in the hopper 1 and fed onto the conveyor 2, where the culls are picked and thrown aside. The conveyor 3 now picks up the fruit and as the space between the ropes 22 and 23 permits, it drops therebetween, and falls upon the table 4, where it is packed for shipment. The space between the ropes 22 and 23 may be accurately adjusted by means of the handles 39 to conform to the various grades desired. The conveyor is driven from a motor 42, which drives a shaft 43 through a belt 44 traveling over pulleys on said motor and shaft. The shaft 28 is driven by a suitable chain 45 traveling over sprockets on said shaft, and on the shaft 43, thereby driving the ropes 22 and 23. The shaft 18 is driven by a chain 46 which encircles sprockets on said shaft, and on the shaft 43, thereby driving the ropes 5 and 7. The shaft 19 is driven from the shaft 18 by a chain 47 encircling sprockets on said shafts, whereby the rope 6 is driven.

The conveyors 2 may be used for grading, as to quality, by having the attendants not only pick out the culls but transfer fruit from the left to the right conveyor and vice versa that is the fruit would be transferred for instance so that the first quality would be on the one side and the second quality on the other side. The conveyor 2, having three ropes and feeding onto the conveyor 3 with two ropes may run at half the speed of the sizing conveyor 3.

It very often happens that fruit runs practically of constant size, in which case the ropes 22 and 23 would need to be spaced about the same distance for the greater part of their length. This would cause the fruit to pile up and fill the first bin more rapidly than the packer could pack the fruit. So that when the first bin is full the packer would turn the handle 39 sufficiently to move a section 37 of the guide 35 closer to the fixed guide 32 and pass the fruit on to the second bin and so on in succession until all the bins were filled. In this manner any bin may be filled by opening the spacing of the ropes.

Figure 4 shows the guide 35 and the junction point of two sections 37 supported on the inturned bottom flange of the bracket 36. A plate 38 overlaps the two sections and the back of the plate is engaged by the screw which is operated by the threaded handle 39 so that the plate and the sections 37 may be moved in or out and the conveyor rope 22 follows across the junction point.

The sizing portion of the machine is usually at least forty feet long and would have about eight or more sections 37 to provide for sizing into the usual five foot bins. Presuming that the outer guide for the movable sections was positioned so that a plurality of bins would handle substantially a uniform size fruit by the conveyor ropes 22 and 23 being substantially parallel on account of their guides being parallel then if it is desired to narrow one section so as to convey the fruit onward when a bin is filled the screws at each end of a section 37 could be operated to move the whole section inward slightly. This would cause the sections 37 immediately contiguous with this section to incline slightly inward, but this movement would be so slight compared with the whole section of about five feet that the fruit would still drop through the adjacent bin. Then if the packer desired to open his section again to fill his bin he could operate both screws to move the section out again.

The manner above described would give the most accurate adjustment. However, in the usual operation it is sufficient after the whole movable guide has been placed in the position desired and the packer wants to change the spacing of the conveyor ropes 22 and 23 at his particular bin he may operate only one screw by the handle 39 which will either thrust the adjoining ends of the two sections 37 inwardly or he may draw them out. This, of course, leaves his bin with a slight inward and outward taper relative to its former position if he thrusts the sections inwardly or a slight outward and then an inward taper if he draws them outwardly. The operation of each individual screw turned by the handle 39 therefore in effect only operates one portion of the guide so far as it functions to drop the fruit or pass it on without affecting the portion at the adjacent bin. The packer usually shifts the cross walls of the bins into the proper position relative to the screw controlling the sectional guides.

The term "portion" has been used in the claims to indicate part of the total conveyor which may be movable in and out by moving either one of the sections by the two screws at each end or by operating two sections by the single screw as these are optional ways to manipulate the machine.

Having described my invention, I claim:

1. A grader having a pair of spaced conveyors each moving in substantially a direct line without reversals from the conveying part of the grader adapted to size fruit therebetween, means to drive the conveyors, a sectional guide for one of the conveyors, means to move a portion of the guide laterally of the direction of travel of the conveyor without substantially altering the position of contiguous sections whereby the spacing of the conveyor may be greater at a position near the feeding-in end than further along the conveyor to receive fruit thereat, said means to move the portion of the guide also being adapted to move the portion inward to narrow the spacing of the conveyor to pass the fruit on.

2. A fruit grader having a pair of spaced ropes forming a conveyor, said ropes running in substantially a direct line without reversals through the grading part of the machine, a fixed guide for one of the ropes and a guide divided into a plurality of transversely movable sections for the other rope, a transverse screw connected to each of said movable sections of the guide and to a fixed part of the grader, means positioned at the side of the grader to operate each screw, whereby any section may be adjusted transversely to increase or decrease the spacing of the fixed guide and a section of the movable guide without substantially altering the spacing of any other section, whereby the rope conveyors may be positioned a greater distance apart near the feeding in end than further along the conveyor.

3. A fruit grader comprising in combination a longitudinally extending framing, a pair of rope conveyors extending along opposite sides of said framing, said ropes traveling in substantially a straight line without reversals through the grading part of the framing, a pair of fixed guides back to back along the center of the framing, forming guides for one pair of ropes, a series of transverse brackets extending across the frame from side to side, a pair of outside longitudinal guides for the outside pair of ropes, said outside guides being divided into a plurality of transversely movable sections, threaded screws operatively connected between said brackets and the transversely movable guide sections, said screws being spaced along each side of the grader and means to operate said screws whereby the pairs of ropes forming a conveyor may be spaced different distances apart longitudinally of the grader and a section near the feeding in end may be spaced wider or narrower than a section at the further end of the grader.

4. A fruit grader or the like comprising in combination a longitudinal framing, having a series of center posts, fixed guideways extending longitudinally on opposite sides of said posts, a series of brackets spaced transversely across said posts from side to side of the framing, inwardly turned ends on said brackets, sectional guideways mounted on said inwardly turned ends, said sections being movable transversely, a series of screws threaded through said brackets and connected to said sections, two pairs of ropes forming conveyors, one rope of each pair operating in the fixed guides in substantially a straight line from one end of the grader to the other, the other ropes of the pair of conveyors operating in the sectional guides, grooves in said sectional guides to hold the rope in the transverse movement of the sectional guides and means to operate the said screws to move any section without substantially altering the spacing of a contiguous section, whereby a section adjacent the feeding in end of the grader may be spaced narrower or wider from the fixed guide than at the further end of the grader.

5. A method of sizing fruit or vegetables to substantially a single size by dropping into bins between two spaced moving rope conveyors, said conveyors moving in substantially a straight line, whereby the fruit is carried without relative movement on the conveyors, comprising spacing the conveyors, a sufficient distance apart to carry the desired grade to be sized through the conveyor without dropping through the conveyors, spacing the conveyors an increased distance apart near the feeding in end whereby a bin may be filled, then narrowing the space to pass the fruit and increasing the space further along the conveyors to drop the fruit into another bin and as a later step widening the conveyors at the first bin to again drop fruit therein.

6. The method of sizing fruits or vegetables to a substantially uniform size by dropping them between two spaced conveyors into bins comprising spacing the conveyors to the desired size for a sufficient length of the conveyors to fill a plurality of bins with substantially the same sized fruit or vegetables, when a bin near the feed in end is full, narrowing the space of the conveyors at said bin and passing the fruit to a further bin.

7. A method of sizing fruit to a series of different sizes with a relatively large proportion of the fruit being sized to substantially a uniform size by dropping into bins between two spaced moving rope conveyors, said conveyors moving in substantially a straight line, whereby the fruit is carried without relative displacement between it and the conveyors, comprising spacing the conveyors over a relatively large number of the bins to drop fruit of the uniform size therein and spacing the remaining part of the conveyors to give increasing or decreasing sizes, filling the bin with the uniform size at the feed in end, then narrowing the conveyors above said bin and passing the fruit on to the succeeding uniform size fruit bins, as a further step narrowing the conveyors above the second mentioned bin and passing the fruit on to succeeding bins and, as a still further step, widening the conveyors at the first uniform size bin to drop fruit therethrough.

8. A fruit grader comprising in combination a feeding conveyor composed of a plurality of ropes forming a pair of parallel conveyors adapted to carry fruit, a sizing conveyor composed of a plurality of ropes forming a single conveyor adapted to drop fruit therebetween, said feeding and sizing conveyors being adapted to transfer fruit therebetween and means to drive the conveyors, said feeding and sizing conveyors being on substantially the same level.

9. A fruit grader comprising in combination a feeding conveyor composed of a plurality of ropes forming a pair of parallel conveyors adapted to carry fruit, a sizing conveyor composed of a lesser number of ropes forming a single conveyor adapted to drop fruit therebetween, said feeding and sizing conveyors being adapted to transfer fruit therebetween and means to drive the sizing conveyor at a higher speed than the feeding conveyor, said feeding and sizing conveyors being on substantially the same level.

10. A fruit grader comprising in combination a feeding conveyor composed of three ropes adapted to carry fruit, a sizing conveyor composed of two ropes adapted to drop fruit therebetween, the ropes of the feeding and sizing conveyors overlapping whereby the fruit is transferred from the feeding to the sizing conveyors and means to drive the sizing conveyor at a higher speed than the feeding conveyor, said feeding and sizing conveyors being on substantially the same level.

11. A fruit grader comprising a feeding conveyor composed of three ropes adapted to carry fruit, a sizing conveyor composed of two ropes adapted to drop fruit therebetween, said conveyors having pulleys at their adjacent ends, the pulleys of the outside ropes of the feeding conveyors being spaced further along the grader than the pulleys for the sizing conveyors and the center pulley for the feeding conveyor being positioned close to the pulleys of the sizing conveyor, said feeding and sizing conveyor being at substantially the same level, whereby fruit is transferred from the feeding conveyor to the sizing conveyor.

12. A grader having a pair of spaced conveyors each moving in substantially a direct line without reversals from the conveying part of the grader adapted to size fruit there between, means to drive said conveyors, a fixed guide for one of the conveyors and a laterally movable guide for the other conveyor, means to move a portion of the movable guide laterally of the direction of travel of the conveyor without substantially altering a contiguous portion of the movable guide, whereby the spacing of the conveyor may be greater at a position near the feeding-in end than further along the conveyor to receive fruit thereat, said means to move the portion of the guide also being adapted to move the said portion inward to narrow the spacing of the conveyors to pass the fruit on.

13. A fruit grader having a pair of spaced ropes forming a conveyor, said ropes running in substantially a direct line without reversals through the grading part of the machine, a fixed guide for one of the ropes and a guide having a portion thereof transversely movable relative to the stationary guide, a plurality of transverse screws connected at intervals along the side of the movable guide and to fixed parts of the grader, means positioned at the side of the grader to operate each screw whereby any particular portion of the movable guide may be adjusted transversely to increase or decrease the spacing of the guides without substantially altering the spacing of any other portion, whereby the rope conveyors may be positioned a greater distance apart near the feeding-in end than further along the conveyor.

14. A fruit grader comprising in combination a longitudinally extending framing, a pair of rope conveyors extending along opposite sides of said framing, said ropes traveling in substantially a straight line without reversals through the grading part of the framing, a pair of fixed guides back to back along the center of the framing, forming guides for one pair of ropes, a series of transverse brackets extending across the frame from side to side, a pair of longitudinal guides for the outside pair of ropes, said guides being constructed whereby different portions may be moved transversely, threaded screws operatively connected between said brackets and the transversely movable guide, said screws being spaced along each side of the grader and means to operate said screws whereby the pair of ropes forming a conveyor may be spaced different distances apart longitudinally of the grader and a portion near the feeding-in end may be spaced wider or narrower than a portion at the further end of the grader.

15. A fruit grader or the like comprising in combination a longitudinal framing having a series of center posts, fixed guideways extending longitudinally on opposite sides of said posts, a series of brackets spaced transversely across said posts from side to side of the framing, inwardly turned ends on said brackets, a transversely movable longitudinal guideway, mounted on said inwardly turned ends, a series of screws threaded through said brackets and connected to the movable longitudinal guideway at different positions along its length, two pairs of ropes forming conveyors, one rope of each pair operating in the fixed guides in substantially a straight line from one end of the grader to the other, the other ropes of the pair of conveyors operating in the movable guide, grooves in said movable guide to hold the rope in a transverse movement thereof and means to operate said screws to move any portion of the movable guides without substantially altering the spacing of the contiguous portion from the fixed guide, whereby a portion of the movable guide adjacent the feeding-in end of the grader may be spaced narrower or wider from the fixed guide than at the further end of the grader.

In testimony whereof I affix my signature.

JAMES CASSIE.